United States Patent [19]

Cryan et al.

[11] Patent Number: 5,408,554
[45] Date of Patent: Apr. 18, 1995

[54] FIBER OPTIC COUPLING

[75] Inventors: Colm V. Cryan, Arlington; David W. Stowe, Milford; Dave R. Maack, Mendon, all of Mass.

[73] Assignee: Porta System Corporation, Syosset, N.Y.

[21] Appl. No.: 169,512

[22] Filed: Dec. 17, 1993

[51] Int. Cl.6 ............................................. G02B 6/28
[52] U.S. Cl. ........................................ 385/43; 385/42; 385/46; 385/51; 65/406
[58] Field of Search .................... 385/42, 43, 46, 51; 65/4.1, 4.2, 4.3

[56] References Cited

U.S. PATENT DOCUMENTS

| | | | |
|---|---|---|---|
| 3,554,721 | 1/1971 | Gardner | 65/4 |
| 3,579,316 | 5/1971 | Dyott et al. | 65/4 |
| 3,917,383 | 11/1975 | Cook et al. | 385/54 |
| 4,203,650 | 5/1980 | Millet et al. | 385/54 |
| 4,291,940 | 9/1981 | Kawasaki et al. | 385/43 |
| 4,330,170 | 5/1982 | Johnson et al. | 385/43 |
| 4,355,863 | 10/1982 | Aulich et al. | 385/51 |
| 4,439,221 | 3/1984 | Smyth et al. | 65/4.21 |
| 4,449,781 | 5/1984 | Lightstone et al. | 385/43 |
| 4,474,431 | 10/1984 | Bricheno | 385/24 |
| 4,591,372 | 5/1986 | Bricheno et al. | 65/4.2 |
| 4,653,845 | 3/1987 | Tremblay et al. | 385/46 |
| 4,682,849 | 7/1987 | Kowata et al. | 385/43 |
| 4,709,981 | 12/1987 | Mori | 385/73 |
| 4,798,436 | 1/1989 | Mortimore | 385/43 |
| 4,915,469 | 4/1990 | Byron et al. | 385/46 |
| 4,923,268 | 5/1990 | Xu | 385/50 |
| 4,986,620 | 1/1991 | Severijns et al. | 385/15 |
| 5,121,452 | 6/1992 | Stowe et al. | 385/46 |
| 5,129,021 | 7/1992 | Mortimore et al. | 385/46 |
| 5,137,351 | 8/1992 | So | 356/73.1 |
| 5,148,509 | 9/1992 | Kannabiran | 385/109 |
| 5,175,779 | 12/1992 | Mortimore | 385/43 |
| 5,175,782 | 12/1992 | Bowen et al. | 385/51 |
| 5,268,979 | 12/1993 | Weidman | 385/42 |

FOREIGN PATENT DOCUMENTS

| | | | |
|---|---|---|---|
| 0013972 | 6/1980 | European Pat. Off. | G02B 5/14 |
| 0212954 | 3/1987 | European Pat. Off. | G02B 6/26 |
| 55-127502 | 3/1979 | Japan | G02B 5/14 |
| 57-186730 | 5/1981 | Japan | G02B 27/10 |
| 58-153916 | 3/1982 | Japan | G02B 27/10 |
| 63115112 | 11/1986 | Japan | G02B 6/28 |
| 63-217314 | 3/1987 | Japan | G02B 6/28 |
| WO87/00934 | 2/1987 | WIPO | G02B 6/28 |
| WO90/11540 | 10/1990 | WIPO | G02B 6/28 |

OTHER PUBLICATIONS

Mortimore, D. B.; "Theory and fabrication of 4×4 single-mode fused optical"; *Applied Optics;* vol. 29, No. 3, p. 371; (Jan. 1990).

Snyder, A. W.; "Coupled-Mode Theory for Optical Fibers"; *J. Optic. Soc. of Amer.;* vol. 62, No. 11, p. 1267; (Nov. 1972).

"Single-Mode Fibre Y-Junction Beam-Splitter"; *Electronic Letters;* vol. 23, No. 20; (Sep. 1987).

Mortimore, D. B. et al; ":Low-Loss Joints Between Dissimilar Fibres by Tapering Fusion Splices"; *Electronics Letters;* vol. 22, No. 6, p. 318; (13 Mar. 1986).

Mortimore, D. B.; "Wavelength-Flatteded Fused Couplers"; *Electronics Letters;* vol. 21, No. 17, p. 742; (15 Aug. 1985).

Primary Examiner—Frank Gonzalez
Attorney, Agent, or Firm—Fish & Richardson

[57] ABSTRACT

In one aspect, the invention concerns fused fiber optic couplers of the type formed from fibers of transparent substance each having a circular cross-section of preselected diameter. The fibers include a central fiber and at least one ring of closely packed surrounding fibers with at least some of the fibers being optical fibers that have a core and a surrounding cladding. The coupler is formed by the processes of providing the fibers, assembling them in a close-packed relationship, and heating and drawing the assembly of fibers in the close-packed region.

We have discovered that the steps involved in forming such a coupler, introduce slight size variations that can seriously affect the performance of the coupler, and that these slight variations can be accommodated by slight, controlled, under-sizing of one or more of the surrounding fibers or over-sizing of the central fiber.

24 Claims, 8 Drawing Sheets

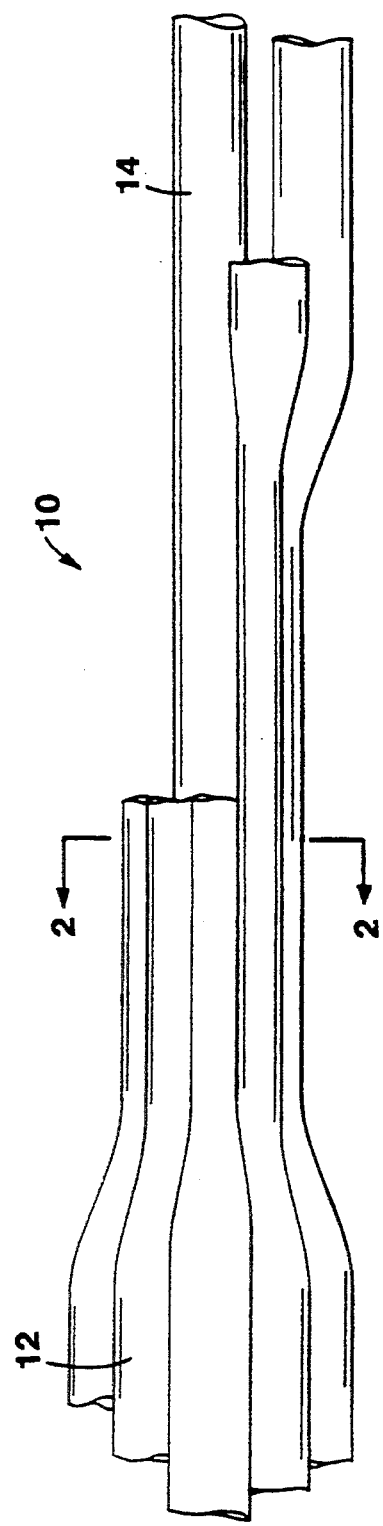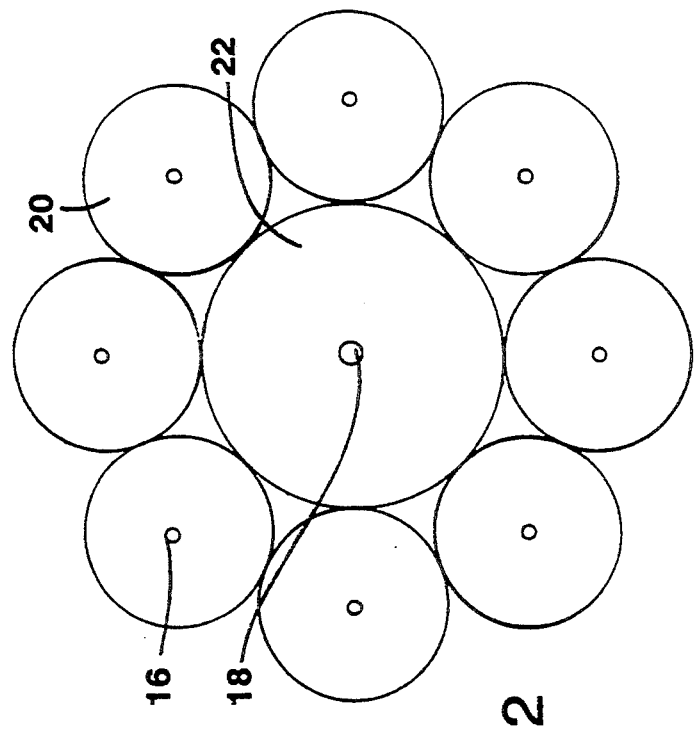

| Pitch (P) mm | 1X6 Δd μm | 1X8 Δd μm |
|---|---|---|
| 5 | 1.54 | 0.63 |
| 6 | 1.07 | 0.44 |
| 7 | 0.79 | 0.32 |
| 8 | 0.60 | 0.25 |
| 9 | 0.48 | 0.19 |
| 10 | 0.39 | 0.16 |
| 11 | 0.32 | 0.13 |
| 12 | 0.27 | 0.11 |
| 13 | 0.23 | 0.09 |
| 14 | 0.20 | 0.08 |
| 15 | 0.17 | 0.07 |
| 16 | 0.15 | 0.06 |
| 17 | 0.13 | 0.05 |
| 18 | 0.12 | 0.05 |
| 19 | 0.11 | 0.04 |
| 20 | 0.10 | 0.04 |
| 21 | 0.09 | 0.04 |
| 22 | 0.08 | 0.03 |
| 23 | 0.07 | 0.03 |
| 24 | 0.07 | 0.03 |
| 25 | 0.06 | 0.03 |
| 26 | 0.06 | 0.02 |
| 27 | 0.05 | 0.02 |
| 28 | 0.05 | 0.02 |
| 29 | 0.05 | 0.02 |
| 30 | 0.04 | 0.02 |

FIG. 6

FIBER OPTIC COUPLING

CROSS REFERENCE TO RELATED APPLICATIONS

This patent application is related to U.S. Pat. No. 5,121,452, issued Jun. 9, 1992, entitled "Fiber optic Powersplitter", U.S. Pat. No. 5,166,994, issued Nov. 24, 1992, entitled "Low Cost 1×8 Single Mode Optical Fiber Coupler", and co-pending application U.S. Ser. No. 08/043,358(still pending), entitled "Fiber optic Couplers", all three of which are incorporated by reference as if fully set forth herein.

BACKGROUND

The invention relates to fiber optic coupling.

Fiber optic couplers have been developed for the purpose of splitting the optical power available on a single fiber into several outputs. In a fiber optic coupler, optical power in an input optical fiber becomes distributed among all the optical fibers in the structure. Light not coupled to the neighboring fibers remains in the input fiber. The term "coupling ratio", as used herein, is defined as the ratio of the optical power in any one output fiber to the total output optical power in the coupler.

Fiber optic couplers are fabricated by fusing two or more optical fibers together in a coupling region. Successful coupler fabrication depends upon controlling the placement of the fibers brought into contact with each other in the coupling region prior to fusing. Imperfections such as dirt on the fiber surfaces, imbalances in tension forces applied to the fibers prior to the application of fusion heat, and three-dimensional non-uniformities in the applied fusion heat can reduce the coupler fabrication yield.

Fused couplers have been made from seven cylindrical fibers, in which six fibers surround a seventh central fiber. Due to the circular cross-section of the fibers, six identical fibers can be arranged around an identical central fiber so that each of the surrounding fibers will contact two neighboring surrounding fibers and the central fiber. The term "cross-section", as used herein, is defined as a cut lying in a plane perpendicular to the longitudinal axis of the coupler (i.e., the direction of propagation of light in the coupler). Mutual contact among the fibers promotes uniform fusion, and results in greater output power uniformity. The term "output power uniformity", as used herein, refers to the output power difference between the output fiber with the maximum optical power and the output fiber with the minimum optical power.

As taught by Stowe et al. (1992, U.S. Pat. No. 5,121,452, by one of the inventors here) unitary couplers of the form 1×N, with N fibers surrounding a central fiber, may be fabricated if the diameter d of the surrounding fibers is related to the diameter of the central fiber D according to the following diameter-ratio-equation:

$$d/D = \sin(\pi/N)/(1 - \sin(\pi/N)).$$

For example, couplers employed in distribution systems that require splitting in multiples of four (e.g., 1×4, 1×8, 1×12, and 1×16 port configurations) may be fabricated by sizing fibers according to the above equation.

SUMMARY

The invention concerns fused fiber optic couplers of the type formed from axially elongated, cylindrical fibers of transparent substance each having a circular transverse cross-section of preselected diameter. The fibers include a central fiber and at least one ring of N surrounding fibers. At least some of the fibers are optical fibers that have a core and a surrounding cladding. The coupler is formed by the processes of providing the fibers, assembling them into a structure in which the constituent fibers have a close-packed relationship to one another, and then heating and drawing the assembly of fibers.

We have discovered that the steps involved in forming such a coupler, introduce slight size variations that can seriously affect the performance of the coupler, and that these slight variations can be accommodated by slight, controlled, under-sizing of one or more of the surrounding fibers or over-sizing of the central fiber.

One aspect of the invention features a coupler characterized in that the sum of the diameters of the surrounding fibers is slightly less than the sum of diameters of a ring of N circles closely-packed about the central fiber in a plane transverse to the longitudinal axis of the central fiber in a manner that provides, during manufacture, slight space in the ring of surrounding fibers to accommodate process-related shifts of the geometric relationship of the fibers to one another, so that, after manufacture a close-packed relationship of the fibers to one another is obtained.

As used herein, the term "close-packed relationship" means that each surrounding fiber touches the central fiber and both neighboring surrounding fibers.

By slightly reducing the diameter of the surrounding fibers beyond that specified by the above diameter-ratio-equation, the optical performance of fiber optic couplers greatly improves. An output power uniformity of about 1½ dB may be achieved with a probability of about 90%. Improved output power uniformity relaxes the dynamic range constraints placed on the associated electronic circuitry, generally improves the performance of the overall optical system, and further allows the optical couplers to be employed in applications requiring better output power uniformity.

Certain embodiments of the invention include one or more of the following features.

A fusing process employed in the manufacture of the coupler preferably uses helical twist of the surrounding fibers to obtain stable contact between all neighboring fibers prior to fusion so that during the fusing process the neighboring surrounding fibers fuse together and to the central fiber in a fused region into a unitary optical structure. The amount by which the sum of diameters of the surrounding fibers is preferably less than the sum of the diameters of the ring of N circles is determined, at least in major part, to accommodate the slight elliptical shape of the cross-section of the surrounding fibers, taken transversely to the axis of the central fiber, attributable to their helical twist relative to the central fiber, so that the desired close-packing relationship of the fibers to one another is obtained.

The helical twist preferably has a pitch in the range of about 0.5 cm to 5 cm and the amount by which the sum of diameters of the surrounding fibers is less than the sum of the diameters of the ring of N circles is substantially inversely proportional to the square of said pitch.

The term "pitch", as used herein, is defined as the distance, measured along the longitudinal axis of the coupler, traversed by a surrounding fiber to complete one helical rotation about the central fiber.

Each of the N circles in the close-packed ring of circles surrounding the central fiber preferably has a diameter d, the central fiber preferably has a diameter D, and the close-packing of the N circles preferably conforms substantially to a ratio of the diameters equal to the value $d/D = \sin(\pi/N)/(1-\sin(\pi/N))$.

After manufacture, the surrounding fibers may have substantially the same diameter, or at least two of the surrounding fibers may have different diameters.

The processes of heating and fusing are preferably performed in a fused region, and the central fiber and the surrounding fibers are preferably formed of identical fibers that extend beyond the fused region. The difference in diameters of the fibers in the fused region is preferably the result of a substantially uniform decrease in the diameter of the surrounding fibers or a substantially uniform increase in the diameter of the central fiber, prior to fusion. At least one of the surrounding fibers may have a smaller diameter than the diameter of the central fiber.

The reduction in the surrounding fiber diameter is preferably achieved by etching, drawing, preselection of a smaller diameter fiber (within the manufacturing tolerances) or a combination of these techniques. The increase in the central fiber diameter is achieved, prior to fusion, by the addition of a material to the outer surface of the central fiber that has a refractive index that is greater than or about equal to the refractive index of the cladding surrounding the central fiber.

The surrounding fibers may be preselected to have a smaller diameter than the central fiber, or the central fiber may be preselected to have a larger diameter than the surrounding fibers.

The coupler has a larger bandwidth of optical wavelength response and an improved output power uniformity relative to a coupler formed of the same fibers without the accommodation of the process-related shifts.

In another aspect, the process-related shift is based at least in part on an effective reduction in the diameter of the central fiber caused by inward indenting pressure of the surrounding fibers upon the central fiber during the heating and fusing step of manufacture.

The central fiber may be constructed to serve as an input port for optical power, the surrounding fibers may each be constructed to function as an output port, and the formation of the fused region is controlled in order to achieve a desired coupling ratio. The desired coupling ratio is preferably characterized in that the fraction of output power that couples to each of the surrounding fibers is substantially $1/N$ or $1/(N+1)$.

The term "spacer fiber", as used herein, is defined as a fiber of transparent material that has a refractive index substantially matched to the refractive index of the cladding of the optical fibers, but has no optical core.

Embodiments of this aspect of the invention preferably include a fiber optic coupler comprising a multiplicity of optical fibers each having a core and a surrounding cladding, and a multiplicity of spacer fibers that each have a refractive index substantially matched to the refractive index of the cladding of the optical fibers. For example, at least the central fiber is a spacer fiber and at least some of the surrounding fibers are optical fibers, or at least the central fiber is an optical fiber and at least some of the surrounding fibers are spacer fibers.

In another aspect, the invention features $1 \times M$ (M taking a value of 2, 3, 4, 5 or 6) and $1 \times N$ (N taking an integer value greater than 6) fiber optic couplers characterized in that the sum of the diameters of the surrounding fibers is slightly less than the sum of diameters of a ring of N circles closely-packed about the central fiber in a plane transverse to the longitudinal axis of the central fiber in a manner that provides, during manufacture, slight space in the ring of surrounding fibers to accommodate process-related shifts of the geometric relationship of the fibers to one another, so that, after manufacture a close-packed relationship of the fibers to one another is obtained.

In a preferred coupler that includes two layers of surrounding fibers, one of the fibers (either an optical fiber or a spacer fiber) is surrounded by an inner ring of six optical and spacer fibers, and an outer ring of twelve optical and spacer fibers that are located substantially symmetrically around the central fiber.

BRIEF DESCRIPTION OF THE DRAWINGS

FIG. 1 is a side view in, partial cutaway, of a $1 \times 8$ fiber optic coupler formed of eight optical fibers of a substantially identical diameter arranged in a close-packed configuration about a central fiber in accordance with the present invention.

FIG. 2 is a cross-sectional view of the fiber optic coupler of FIG. 1 taken along line 2—2.

FIG. 6 is a table that provides the reduction $\Delta d$ in the diameter of each of the surrounding fibers for a given twist pitch P that is required to compensate for the helical twisting of the fibers during the assembly of $1 \times 6$ and $1 \times 8$ fiber optic couplers.

DETAILED DESCRIPTION

Figure 3:
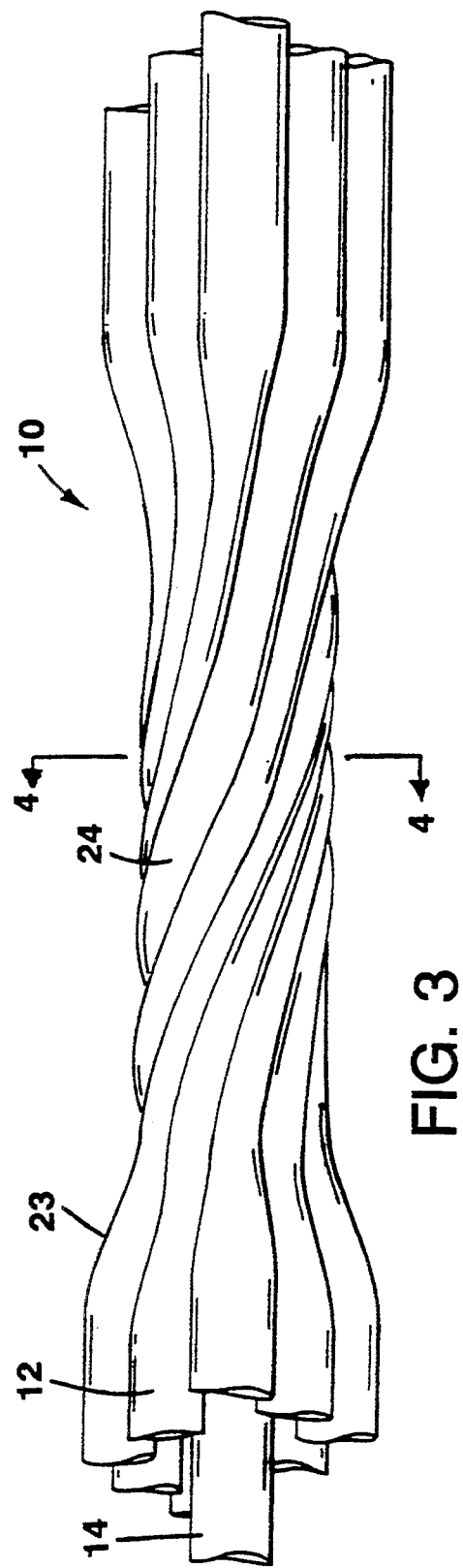
FIG. 3 is a side view of the fiber optic coupler of FIG. 1 formed by twisting, fusing, and drawing the constituent surrounding fibers.

Referring to FIGS. 1 and 2, a fiber optic coupler 10 is formed from a ring of eight cylindrical optical fibers 12, that have a substantially equal diameter, surrounding a central cylindrical optical fiber 14. Prior to fabrication, the central and surrounding optical fibers begin as single-mode telecommunications fibers of about 125 μm outer diameter, that include cores 16 and 18, and cladding 20 and 22, respectively.

The diameter of the surrounding fibers, and the diameter of the central fiber D, are pre-sized (e.g., by etching, by drawing as described by Stowe et al., in U.S. Pat. No. 5,121,452 (assigned to the present assignee) which is incorporated herein by reference, by employing a combination of etching and drawing, by controlling the twist rate, by deposition, by longitudinal compression, or by adding a sleeve of e.g., cladding material, of appropriate thickness about the central or surrounding fibers).

The sum of the diameters of the surrounding fibers is slightly less than the sum of diameters of a ring of a number of circles, equal to the number of surrounding fibers, that each have a diameter d and that are closely-packed about the central fiber in a plane transverse to the longitudinal axis of the central fiber. The ratio d/D, of the diameter of the circles to the central fiber diameter, for coupler 10 is about 0.62, as given by the diameter-ratio-equation:

$$d/D = \sin(\pi/8)/(1-\sin(\pi/8)). \quad (1)$$

The sum of the diameters of the surrounding fibers 12 are reduced by a small amount (e.g., by the above-mentioned techniques) relative to the sum of the diameters of the above circles in a manner that provides, during manufacture, slight space in the ring of surrounding fibers to accommodate process-related shifts of the geometric relationship of the fibers to one another, as explained in detail below, so that, after manufacture, a close-packed relationship of the fibers to one another is obtained.

Figure 4:
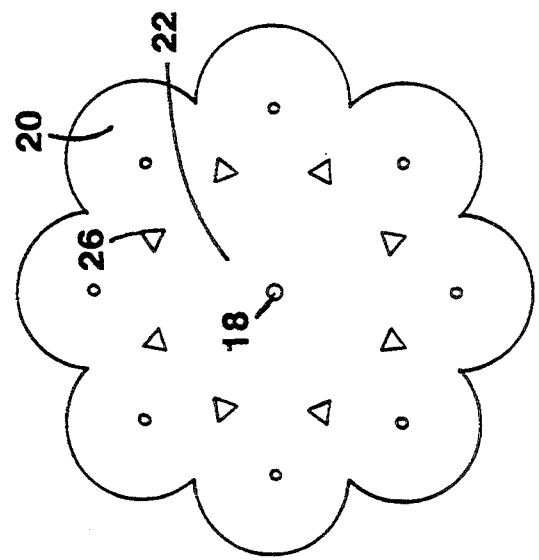
FIG. 4 is a cross-sectional view of the fiber optic coupler of FIG. 3 taken along line 4—4.

During fabrication, coupler 10 is fused and drawn to form a tapered region 23 and a coupling region 24 (FIG. 3), in which the original ratio of diameters d/D is essentially preserved (FIG. 4). Prior to the fusing process, the individual pre-sized fibers are arranged and aligned in a close-packed configuration as shown in FIGS. 1 and 2. The coupler is mounted into the clamps of two translation stages. A heat source (e.g., a torch, an electrically heated resistive wire, an electric arc, or a laser) is applied over a relatively narrow region of the coupler until a suitable working temperature is obtained, at which point one or both translation stages are moved apart to elongate the heated region (these processes are normally referred to as unidirectional or bi-directional drawing, respectively).

During the fuse-drawing process, light is coupled into one of the optical fibers at the input side of the coupler, and is detected in at least one optical fiber at the output side of the coupler. The drawing is continued until the amount of light coupled between the input and output fibers reaches a desired relationship.

To create a radial force that facilitates uniform fusing of the constituent fibers the surrounding fibers may be helically twisted as shown in FIG. 3, prior to, or during fusion. Depending on the type of coupler, or the desired coupling ratio, the coupling region may have a fractional turn or several turns. The pitch of the surrounding fibers is typically between 0.5 cm and 5 cm.

During the fuse-drawing process, the diameter of the coupling region can be reduced by more than 75%. The fused portion of the resulting coupler has a length of several millimeters to a few centimeters, depending in part upon the coupling ratio required and the degree of fusion achieved during the drawing stage. In the cross-section of the fused coupling region (FIG. 4), the surrounding optical fibers are situated symmetrically about the central fiber, in sufficiently close positions so that a desired output power uniformity occurs; the coupling ratio is determined at least in part by the diameter and length of the coupling region, as well as the degree to which the fibers have fused together.

The degree of fusion can be observed by noticing the void regions 26 (FIG. 4), between the central fiber and any two neighboring surrounding fibers. Couplers of the invention can be made to have very little fusion of the optical materials, in which case the void regions are more pronounced and the fibers appear to retain more of their original boundaries. As the degree of fusion is increased the void regions become smaller and the boundaries of the individual fibers are reduced. Even though void regions may be present in any embodiment of the invention, the optical materials are considered to be fused into an essentially solid mass, which is referred to herein as a "unitary optical structure".

Following the fuse-drawing process, the fibers that extend from the coupling region are bonded to a rigid, cylindrical substrate with an adhesive. The coupling region is suspended above the substrate. The bonds are designed to isolate and relieve the strain on the coupling region from external forces. This structure is then enclosed in a tube and an adhesive sealant is used at the end of the tube to protect the coupler. The entire structure may be encapsulated in a protective stainless steel tube.

The inventors have discovered that by slightly reducing the diameter of the surrounding fibers relative to the circles described above, the optical performance of the fiber optic couplers is greatly improved. By accommodating process-related shifts in the geometric relationship of the constituent fibers to one another, fiber optic couplers have been fabricated with greater than 90% probability of having an output power uniformity of 1.1 dB or better.

Subtle, yet important, changes in the geometric relationship of the fibers to one another occur during the fabrication of the coupler. These process-related shifts change the positions of the surrounding fibers relative to the central fiber, and to one another.

When the coupler is twisted as shown in FIG. 3, a slight increase in the diameter of the cross-section of the surrounding fibers occurs, relative to the untwisted coupler of FIG. 1. This is a geometrical feature arising from the fact that an axially elongated cylinder which has a circular cross-section when cut perpendicular to its longitudinal axis will have an elliptical cross-section when cut along another axis. The diameter of the major axis of the ellipse is a minimum for the circular cross-section and increases with the size of the angle formed by the intersection of the circular cut axis (i.e., the axis transverse to the longitudinal axis of the cylinder representing the outer surface of a fiber) of a surrounding fiber and the circular cut axis of the central fiber.

Other effects may also contribute to a mismatch in the sum of the diameters of the surrounding fibers with respect to the central fiber. The axial draw tension in conjunction with the helical twist of the surrounding fibers gives rise to radial forces that drive the surrounding fibers radially toward the central fiber. These forces cause the surrounding fibers to sink into the central fiber, which effectively reduces the diameter of the central fiber. If the reduction in the diameter of the central fiber occurs more rapidly than the deformation of a surrounding fiber with respect to its neighboring surrounding fibers, then there may not be sufficient space to close-pack all of the surrounding fibers around the central fiber.

Diameter variations intrinsic to the constituent fibers (e.g., defects) may also result in insufficient space for close-packing.

Figure 5A:
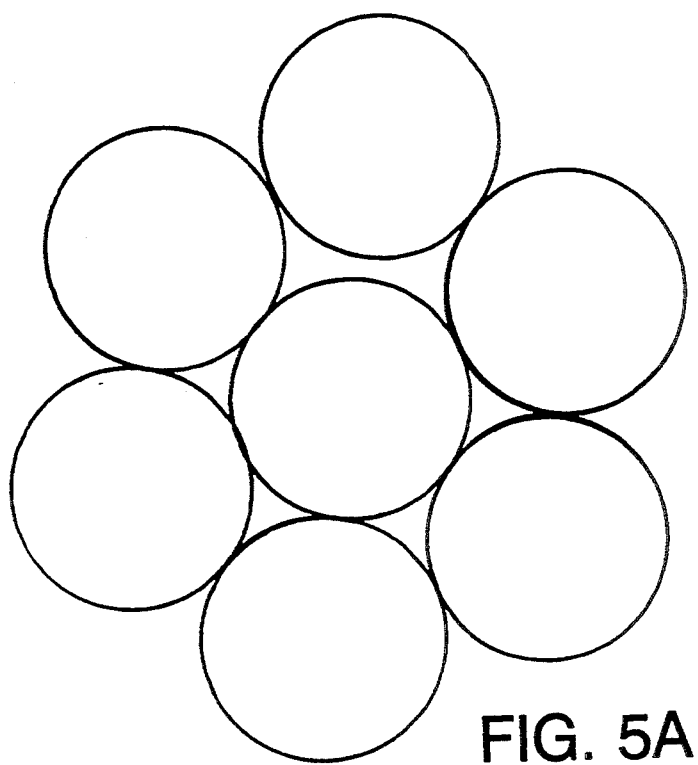
FIG. 5A is an illustrative, cross-sectional view of a seven fiber coupler, prior to fusion, in which the increase of the effective cross-sectional diameters of the surrounding fibers, due to helical twist of the fibers, has caused a shift in the geometric relationship of the constituent fibers to one another so that close-packing of the fibers is not possible.

When at least one of the aforementioned mechanisms inhibiting close-packing is present, typically one or more of the surrounding fibers will not contact the central fiber, as shown in FIG. 5A. In twisted couplers, the ellipticity of the surrounding fibers is too small to be observed directly, and indeed, the presence of the separation gap 28 is the clearest means of observing the effect. It has been observed that, most typically, all but one of the surrounding fibers will be mutually contacting, leaving one of the fibers with a separation gap 28.

Figure 5B:
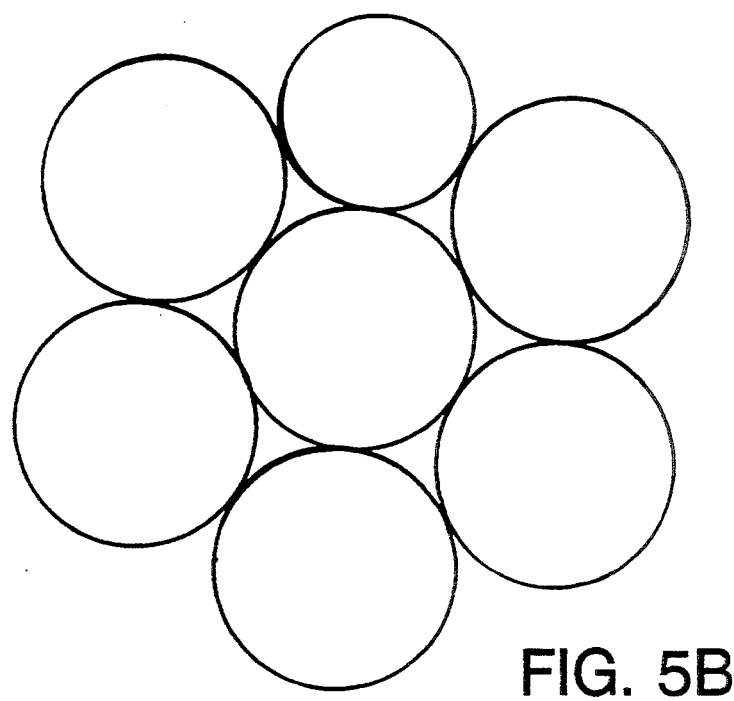
FIG. 5B is a cross-sectional view of a fiber optic coupler in which the diameter of one of the surrounding fibers has been reduced to permit close-packing of the constituent fibers.
Figure 5C:
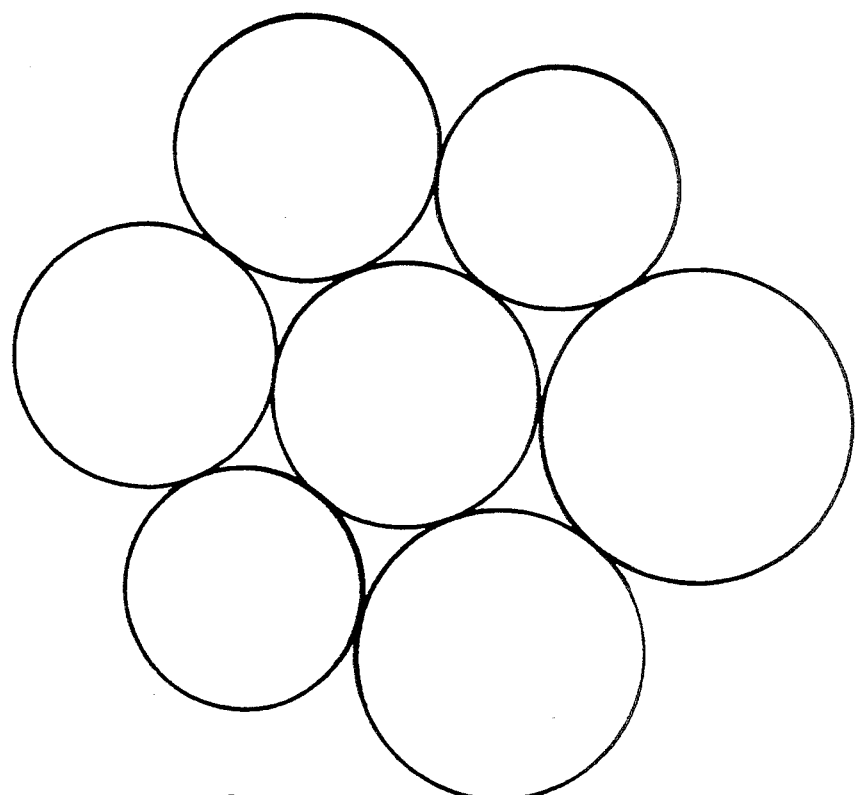
FIG. 5C is a cross-sectional view of a fiber optic coupler in which the diameter of each of the surrounding fibers has been reduced by different amounts to permit close-packing of the constituent fibers.

As shown in FIG. 5B, the diameters of one of the surrounding fibers may be reduced to permit close-packing of the constituent fibers. Alternatively, as shown in FIG. 5C, the diameters of each of the surrounding fibers may be reduced by different amounts to permit close-packing of the constituent fibers.

The diameters of one or all of the surrounding fibers may be appropriately reduced, prior to fusion, to compensate for process-related shifts in the geometric relationship of the constituent fibers to one another. The sum of the diameters of the surrounding fibers should be toleranced to within about a micron for optimal coupler performance.

When every fiber is reduced by the same amount, for a typical 1×6 fused tapered coupler, formed from fibers with diameters of 125 μm, the reduction in the diameter of the surrounding fibers relative to the sum of diameters of a ring of six circles that are closely-packed about the central fiber, in a plane transverse to the longitudinal axis of the central fiber, is of the order of about 0.5 μm.

For N fibers positioned around one central fiber, the apparent increase in diameter Δd of each of the surrounding fibers, caused by the helical twist, can be expressed in general form by equation 2, below $$\Delta d = f(N, D, P) \qquad (2)$$

in which D is the diameter of the central fiber, P is the pitch of the helical twist, and f is a generalized function of these parameters. Using simple geometric arguments, and ignoring secondary considerations, such as Poisson's ratio, the apparent increase in fiber diameter can be approximated by equation 3, below $$\Delta d = \pi^2/(2P^2)(D/(1-\sin(\pi/N)))^3 \sin(\pi/N) \qquad (3)$$

Figure 5D:
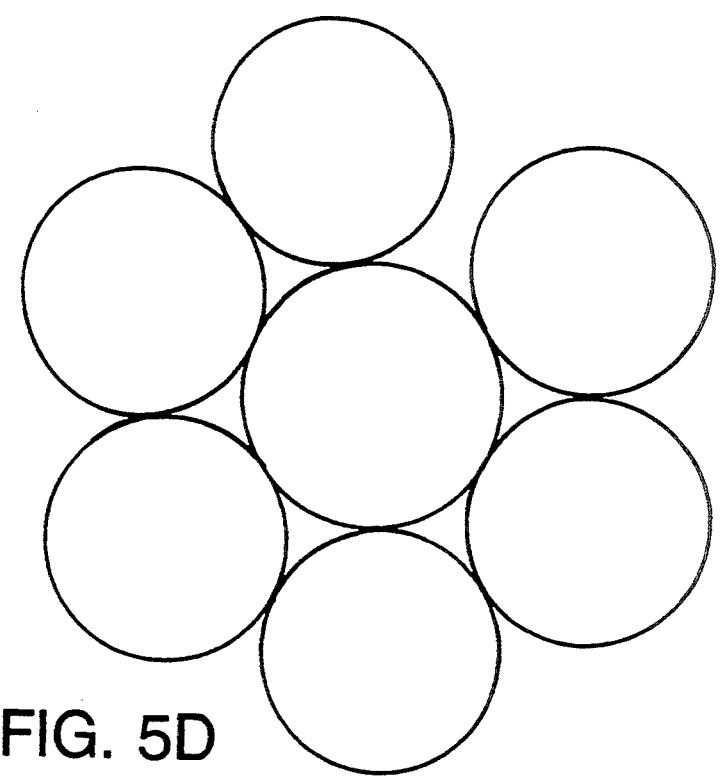
FIG. 5D is a cross-sectional view of a preferred seven fiber coupler, prior to twisting of the surrounding fibers, in which the diameters of each of the surrounding fibers have been reduced by substantially the same amount to compensate for a subsequent helical twist of the surrounding fibers.
Figure 5E:
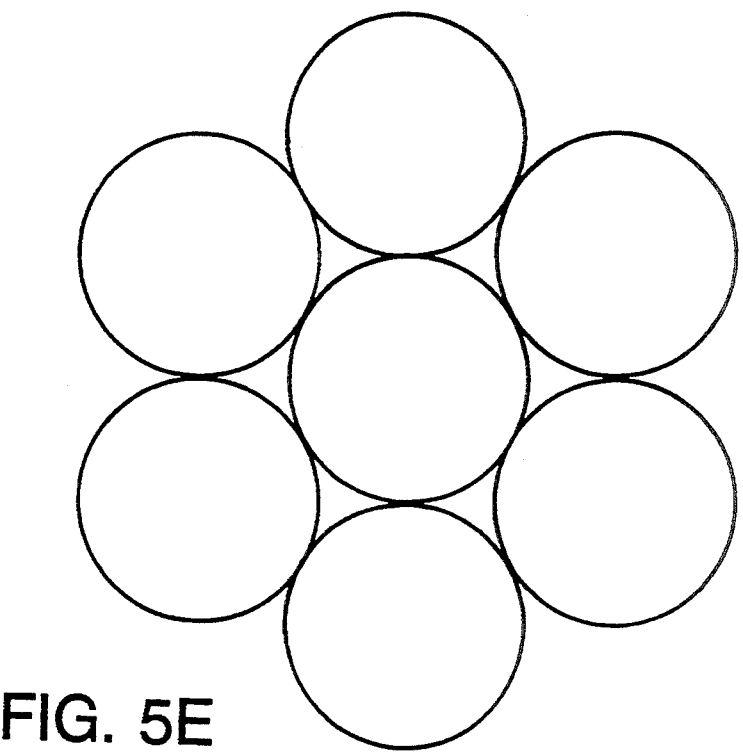
FIG. 5E is a cross-sectional view of coupler of FIG. 5D, after the surrounding fibers have been helically twisted about the central fiber, thereby taking up the slight space in the ring of surrounding fibers in the coupler of FIG. 5D.

In a preferred embodiment, each of the surrounding fibers is reduced in diameter by substantially Δd. FIG. 5D shows a coupler, before the surrounding fibers have been twisted about the central fiber, in which the diameters of each of the surrounding fibers have been reduced by Δd, resulting in a slight space (shown exaggerated) in the ring of surrounding fibers. As shown in FIG. 5E, close-packing of the constituent fibers is achieved in the coupler of FIG. 5D when the surrounding fibers have been helically twisted about the central fiber.

FIG. 6 is a table that illustrates the change in diameter of each of the N surrounding fibers relative to the diameter of a circle in a ring of N identical circles closely-packed about the central fiber in a plane transverse to the longitudinal axis of the central fiber. The change in fiber diameter of each of the surrounding fibers is provided as a function of pitch P, that is required, in a preferred embodiment, to achieve the nine and seven fiber couplers shown in FIGS. 2 and 5E, respectively. The original diameter of each of the surrounding fibers is assumed to be 125 μm.

In the case where the central fiber is encircled by two rings of surrounding fibers, the reduction in diameter of each of the fibers in the inner ring of surrounding fibers can be approximated by equation 2. An approximate value for the reduction in diameter of each of the outer surrounding fibers (relative to an appropriately constructed corresponding ring of circles) can be similarly approximated by equation 2, as long as the fact that the effective diameter of the central fiber relative to the outer surrounding fibers is larger than the effective diameter of the central fiber relative to the inner ring of surrounding fibers is taken into account.

The invention applies to all unitary couplers in which there is a central fiber encircled by one or more layers of surrounding fibers. The fibers in each layer can be sized to leave enough spacing to allow close-packing of the fibers.

Figure 7:
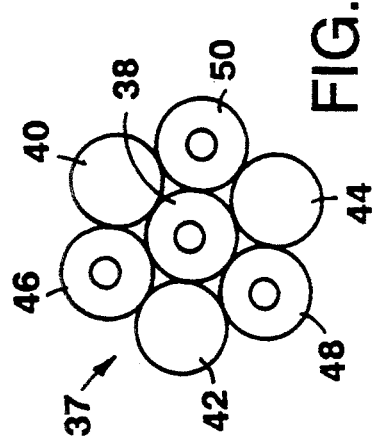
FIG. 7 is a cross-sectional view of a $1 \times 3$ fiber optic coupler formed from optical fibers and spacer fibers arranged in a close-packed configuration in accordance with the present invention.

Referring to FIG. 7, a 1×3 coupler 37 is formed from six fibers surrounding a central optical fiber 38. Spacer fibers 40, 42, and 44 are fabricated from optically transparent material with a refractive index matched to the refractive index of the cladding of the neighboring optical fibers 46, 48, 50, including the central fiber 38. Since the spacer fibers do not have a core, optical power launched in the input fiber will not substantially couple to a spacer fiber, therefore optical power is not substantially lost through the spacer fibers.

Figure 8:
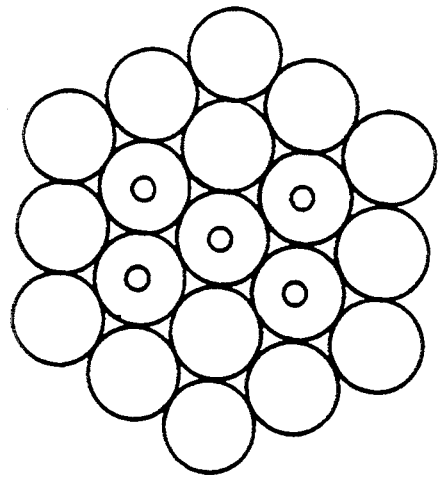
FIG. 8 is a cross-sectional view of a 1×4 fiber optic coupler formed from a surrounding ring of twelve close-packed spacer fibers.

Referring to FIG. 8, in another embodiment, a separate protective ring of twelve spacer fibers surrounds a 1×4 coupler with twelve spacer fibers prior to the fusion process. During the fuse-drawing process, the spacer fibers form a glass barrier, i.e., an outer cladding, that protects the coupler and reduces the effects of the external environment on the coupler performance.

Figure 9:
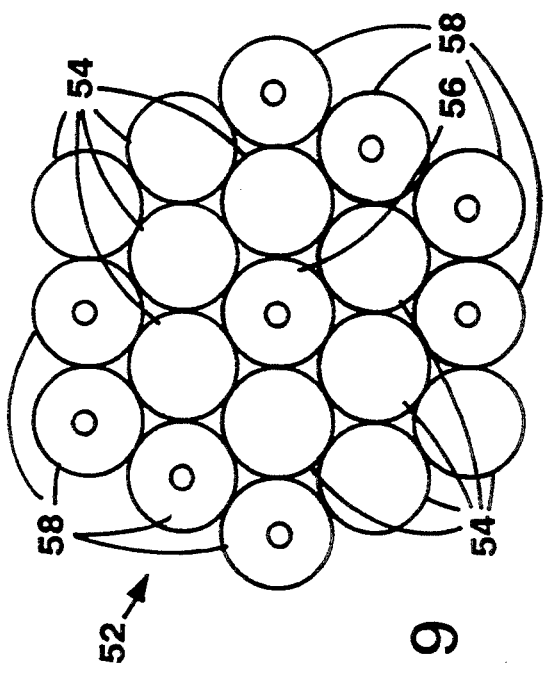
FIG. 9 is a cross-sectional view of a fiber optic coupler formed from nineteen optical and spacer fibers arranged in a close-packed configuration in accordance with the present invention.

As shown in FIG. 9, to achieve a substantially symmetrical arrangement and the appropriate close-packing of the optical fibers in a 1×8 coupler 52, six spacer fibers 54 surround a centrally located optical input fiber 56. Optical output fibers 58 are located in a second ring around the input fiber. The assembly of fibers is fused and drawn to form a tapered coupling region, as described above.

Figure 10:
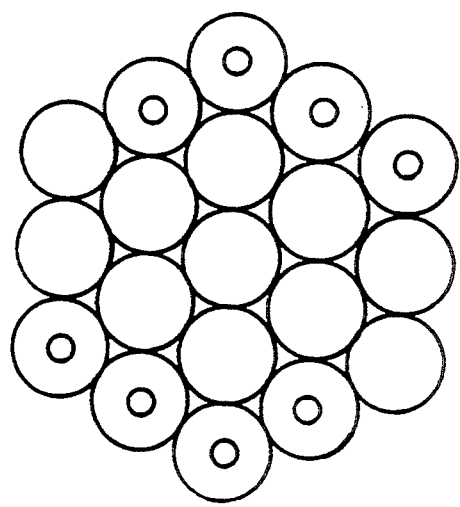
FIG. 10 is a cross-sectional view of an 8×8 fiber optic coupler.

Referring to FIG. 10, a nineteen fiber close-packed configuration is used to fabricate a 8×8 coupler. In the 8×8 coupler, the central optical fiber is a spacer fiber, and the optical fibers of the outer surrounding layer are used as both input and output fibers.

Other embodiments are within the scope of the claims.

For example, couplers that include a larger number of optical fibers (e.g., 9×9, 10×10, etc.) are within the scope of the present invention.

The optical fibers used in the manufacture of the unitary couplers may be multi-mode optical fibers.

Figure 11:
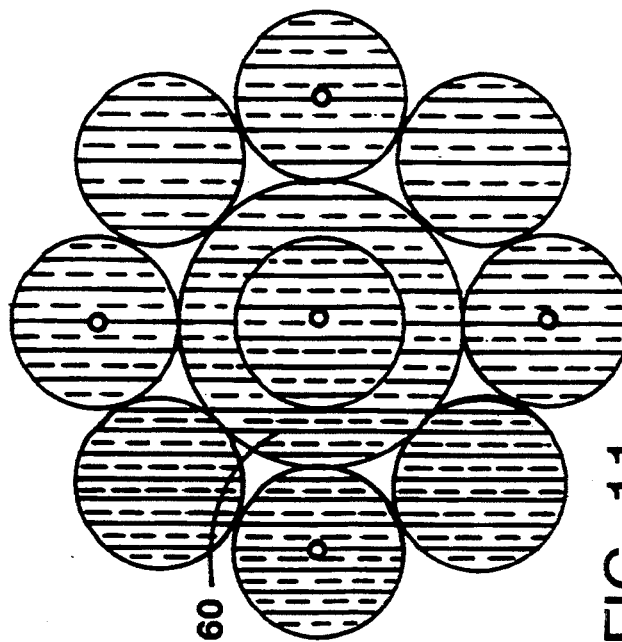
FIG. 11 is a cross-sectional view of a seven fiber coupler in which the central fiber is surrounded by a sleeve to permit close-packing of the constituent fibers.

In addition to slightly reducing the diameters of one or more of the surrounding fibers, the diameter of the central fiber may be enlarged by e.g., adding a sleeve 60 of cladding material around the central optical fiber, as shown in FIG. 11. Four spacer fibers 62 and four optical fibers 64 form a close-packed ring of fibers around sleeve 60.

Sleeve 60 is preferably made of material that has a refractive index that substantially matches the refractive index of the cladding of the optical fibers. Sleeve 60 may instead be made from material that has a refractive index that is greater than the refractive index of the cladding of the optical fibers.

What is claimed is:

1. A fused fiber optic coupler formed from axially elongated, cylindrical fibers of transparent substance each having a circular transverse cross-section of preselected diameter, the fibers including a central fiber and at least one ring of N surrounding fibers, at least some of said fibers being optical fibers having a core and a surrounding cladding, said coupler being formed by the processes of heating and drawing said fibers, the sum of the diameters of said surrounding fibers being slightly less than the sum of diameters of a ring of N circles closely-packed about said central fiber in a plane transverse to the longitudinal axis of said central fiber in a manner providing, during manufacture, slight space in said ring of surrounding fibers to accommodate process-related shifts of the geometric relationship of the fibers to one another, so that, after manufacture, a close-packed relationship of the fibers to one another is obtained.

2. The coupler of claim 1 being further characterized in that a fusing process employed in the manufacture of the coupler uses helical twist of the surrounding fibers to obtain stable contact between all neighboring fibers prior to fusion so that during the fusing process said surrounding fibers fuse together and with the central fiber into a unitary optical structure, and the amount by which said sum of diameters of said surrounding fibers is less than said sum of diameters of said ring of N circles is determined, at least in major part, to accommodate the slight elliptical shape of the cross-section of the surrounding fibers, taken transversely to the axis of the central fiber, attributable to their helical twist relative to the central fiber, so that said close-packed relationship of the fibers to one another is obtained.

3. The coupler of claim 2 wherein said helical twist has a pitch in the range of about 0.5 cm to 5 cm and said amount by which said sum of diameters of said surrounding fibers is less than said sum of diameters of a ring of N circles is substantially inversely proportional to the square of said pitch.

4. The coupler of claim 1 wherein each of said N circles has a diameter d in said fused region, said central fiber has a diameter D in said fused region, and said close-packing of said N circles conforms substantially to a ratio of said diameters equal to the value $d/D = \sin(\pi/N)/(1 - \sin(\pi/N))$.

5. The coupler of claim 1 wherein, after manufacture, each of said surrounding fibers has substantially the same diameter.

6. The coupler of claim 1 wherein, after manufacture, at least two of said surrounding fibers have different diameters.

7. The coupler of claim 1 wherein said processes of heating and drawing said fibers are performed in a fused region of said coupler, said central fiber and said surrounding fibers are formed of identical fibers that extend beyond said fused region, the difference in diameters of said fibers in said fused region being the result of a substantially uniform increase in the diameter of said central fiber or a substantially uniform decrease in the diameter of said surrounding fibers prior to fusion.

8. The coupler of claim 1 wherein said processes of heating and drawing said fibers are performed in a fused region, said central fiber and said surrounding fibers being formed of identical fibers extending beyond the fused region, at least one of said surrounding fibers has a smaller diameter than the diameter of said central fiber in said fused region, the difference in diameters in said fused region being the result of a substantially uniform reduction in the diameters of said at least one surrounding fiber or a substantially uniform increase in diameter of said central fiber prior to fusion.

9. The coupler of claim 7 wherein said uniform decrease in fiber diameter is achieved by etching, drawing or a combination of etching and drawing.

10. The coupler of claim 7 wherein said central fiber comprises an optical core surrounded by a cladding having a refractive index, and said increase in said central fiber diameter is achieved, prior to fusion, by the addition of a material to the outer surface of said central fiber, said material having a refractive index greater than or about equal to the refractive index of said cladding.

11. The coupler of claim 1 wherein said surrounding fibers are preselected to have a smaller diameter than the diameter of said central fiber.

12. The coupler of claim 1 wherein said central fiber is preselected to have a larger diameter than the diameters of said surrounding fibers.

13. The coupler of claim 1 having a larger bandwidth of optical wavelength response relative to a coupler formed of the same fibers without said accommodation of said process-related shifts.

14. The coupler of claim 1 having an improved output power uniformity relative to a coupler formed of the same fibers without said accommodation of said process-related shifts.

15. The coupler of claim 1 wherein said process-related shifts are based at least in part upon an effective reduction in diameter of said central fiber caused by inward indenting pressure of the surrounding fibers upon said central fiber during the fusing step of manufacture.

16. The coupler of claim 1 wherein said central fiber is constructed to serve as an input port for optical power, and said surrounding fibers are each constructed to function as an output port, said coupler having a predetermined desired coupling ratio.

17. The coupler of claim 16 wherein said desired coupling ratio is characterized in that the fraction of output power coupling to each of said surrounding fibers is substantially 1/N.

18. The coupler of claim 17 wherein said desired coupling ratio is characterized in that the fraction of output power that couples to each of said surrounding fibers is substantially 1/(N+1).

19. The coupler of claim 1 wherein at least one of said fibers comprises an optical core surrounded by a cladding having a cladding refractive index, and one of said fibers being adjacent to said at least one fiber is a spacer fiber having a refractive index substantially matched to said cladding refractive index.

20. The coupler of claim 1 wherein at least said central fiber is a spacer fiber and at least two of said surrounding fibers are optical fibers.

21. The coupler of claim 1 wherein at least said central fiber is an optical fiber and at least one of said surrounding fibers is a spacer fiber.

22. A 1×M (M taking a value of 2, 3, 4, 5 or 6) fiber optic coupler comprising:
M+1 substantially equal diameter optical fibers each having a core and a surrounding cladding, and
6-M spacer fibers each of which having a refractive index substantially matched to the refractive index of the cladding of said optical fibers,
one of said M+1 optical fibers being located in the center and the other M optical fibers with said 6-M spacer fibers forming a ring of six fibers around said central fiber in a close-packed configuration characterized in that the sum of the diameters of said surrounding fibers being slightly less than the sum of diameters of a ring of N circles closely-packed about said central fiber in a plane transverse to the longitudinal axis of said central fiber in a manner providing, during manufacture, slight space in said ring of surrounding fibers to accommodate process-related shifts of the geometric relationship of the fibers to one another, so that, after manufacture, a close-packed relationship of the fibers to one another is obtained.

23. A 1×N (N taking an integer value greater than 6) fiber optic coupler comprising:
N substantially equal diameter optical fibers each having a core and a surrounding cladding, and
one central optical fiber,
said N optical fibers forming a ring of fibers surrounding said central fiber in a close-packed configuration characterized in that the sum of the diameters of said surrounding fibers being slightly less than the sum of diameters of a ring of N circles closely-packed about said central fiber in a plane transverse to the longitudinal axis of said central fiber in a manner providing, during manufacture, slight space in said ring of surrounding fibers to accommodate process-related shifts of the geometric relationship of the fibers to one another, so that, after manufacture, a close-packed relationship of the fibers to one another is obtained.

24. A fiber optic coupler comprising:
a multiplicity of optical fibers each having a core and a surrounding cladding, and
a multiplicity of spacer fibers each having a refractive index substantially matched to the refractive index of the cladding of said optical fibers,
one of said optical fibers being located in the center surrounded by a first ring of six optical and spacer fibers, and a second ring of twelve optical and spacer fibers located substantially symmetrically around said central optical fiber and said first ring forming a close-packed configuration characterized in that the sum of diameters of a ring of N circles closely-packed about said central fiber in a plane transverse to the longitudinal axis of said central fiber in a manner providing, during manufacture, slight space in said ring of surrounding fibers to accommodate process-related shifts of the geometric relationship of the fibers to one another, so that, after manufacture, a close-packed relationship of the fibers to one another is obtained.

* * * * *